(12) United States Patent
Sailer

(10) Patent No.: US 11,814,999 B2
(45) Date of Patent: Nov. 14, 2023

(54) MIXING APPARATUS

(71) Applicant: Friedrich Boysen GmbH & Co. KG, Altensteig (DE)

(72) Inventor: Dennis Sailer, Altensteig (DE)

(73) Assignee: Friedrich Boysen GmbH & Co. KG, Altensteig (DE)

( * ) Notice: Subject to any disclaimer, the term of this patent is extended or adjusted under 35 U.S.C. 154(b) by 0 days.

(21) Appl. No.: 17/876,851

(22) Filed: Jul. 29, 2022

(65) Prior Publication Data

US 2023/0037405 A1 Feb. 9, 2023

(30) Foreign Application Priority Data

Aug. 5, 2021 (DE) .......................... 102021120423.2

(51) Int. Cl.
*F01N 13/08* (2010.01)
*F01N 3/20* (2006.01)
*F01N 3/28* (2006.01)

(52) U.S. Cl.
CPC ........... *F01N 3/206* (2013.01); *F01N 3/2892* (2013.01); *F01N 2240/16* (2013.01); *F01N 2610/02* (2013.01); *F01N 2610/102* (2013.01)

(58) Field of Classification Search
CPC .. F01N 3/2013; F01N 3/2892; F01N 2240/16; F01N 2240/20; F01N 2610/102
See application file for complete search history.

(56) References Cited

U.S. PATENT DOCUMENTS

| 10,337,381 | B2 | 7/2019 | Stenfeldt et al. | |
| 2019/0112961 | A1* | 4/2019 | Gaiser | F01N 3/2066 |
| 2019/0112962 | A1 | 4/2019 | Gaiser | |
| 2022/0025803 | A1* | 1/2022 | Webb | F01N 3/28 |

FOREIGN PATENT DOCUMENTS

| DE | 102004020138 A1 | 11/2005 | |
| DE | 102017111125 A1 | 11/2018 | |
| EP | 2090761 A1 * | 8/2009 | ............ B01F 5/0413 |
| EP | 2090761 A1 | 8/2009 | |

(Continued)

OTHER PUBLICATIONS

Machine translation of DE 102017111125 A1, accessed Feb. 10, 2023. (Year: 2023).*

(Continued)

*Primary Examiner* — Jonathan R Matthias
(74) *Attorney, Agent, or Firm* — Dickinson Wright PLLC

(57) ABSTRACT

The present invention relates to a mixing apparatus for introducing and distributing a liquid additive into a gas flow, in particular for an exhaust gas system of an internal combustion engine. The mixing apparatus comprises a gas-guiding section for guiding the gas flow and a metering-in device for introducing the additive into a metering-in region of the gas-guiding section. Furthermore, a heating device for actively heating at least one heating section of the gas-guiding section is provided. The heating section is arranged in the metering-in region and/or downstream of the metering-in region. The gas-guiding section has, in the heating section, at least one elevated portion projecting radially into the gas flow for influencing the flow of the gas flow and thus the preparation of the additive.

25 Claims, 6 Drawing Sheets

(56) References Cited

FOREIGN PATENT DOCUMENTS

| | | | |
|---|---|---|---|
| EP | 2268904 | B1 | 11/2011 |
| EP | 3406873 | A1 | 11/2018 |
| FR | 1481365 | A * | 5/1967 |
| KR | 20110063137 | A * | 10/2011 |
| WO | 2006/003868 | A1 | 1/2006 |
| WO | 2017/198292 | A1 | 11/2017 |
| WO | 2017198292 | A1 | 11/2017 |

OTHER PUBLICATIONS

Machine translation of EP 2090761 A1, accessed Feb. 10, 2023. (Year: 2023).*
German Search Report dated Mar. 24, 2022 for German Application No. 10 2021 120 423.2, 8 pages.
European Search Report dated Dec. 15, 2022 corresponding to European Patent Application 122181541.8, 4 pages.

* cited by examiner

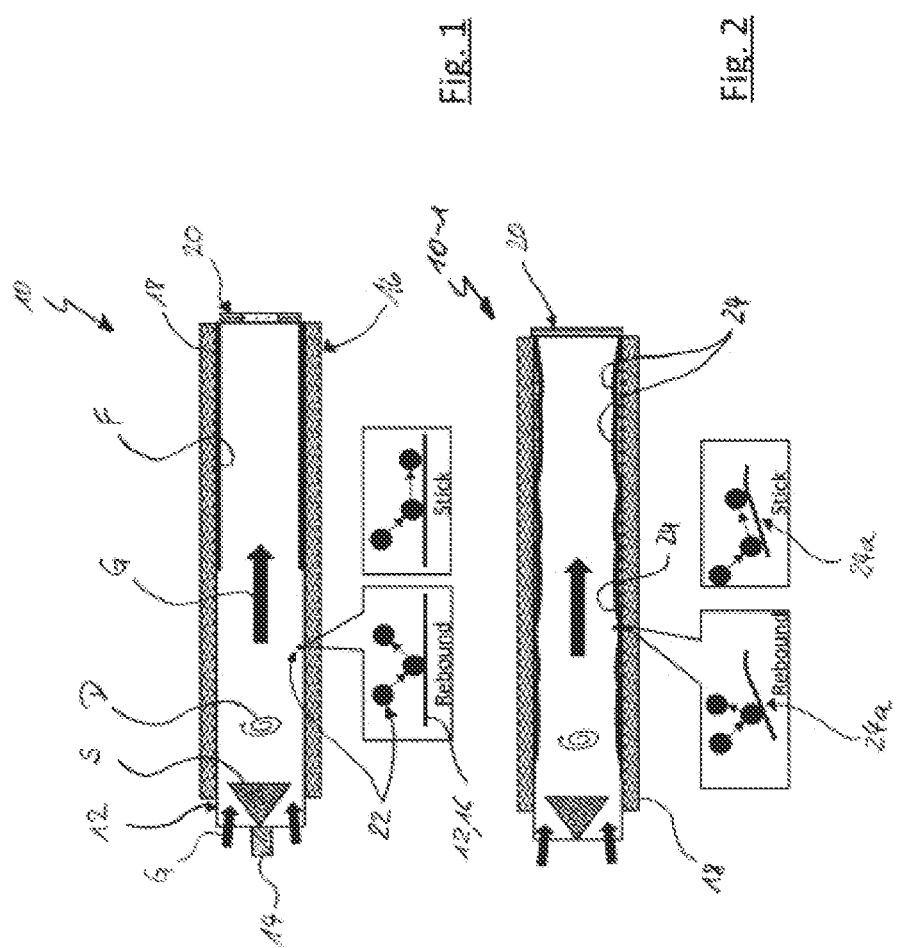

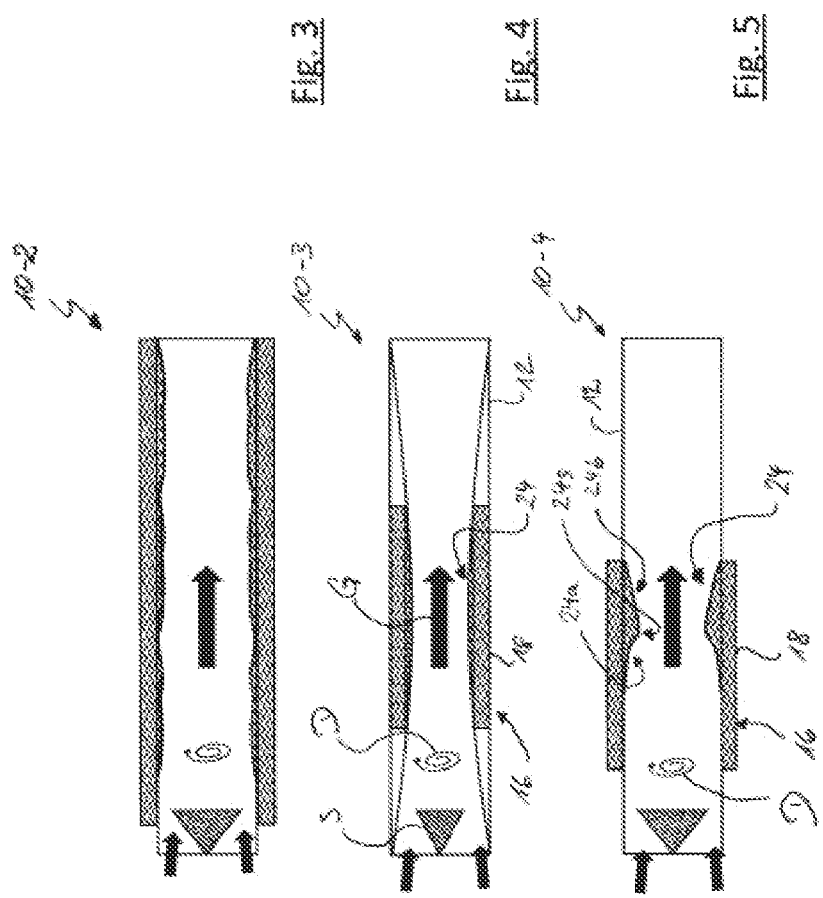

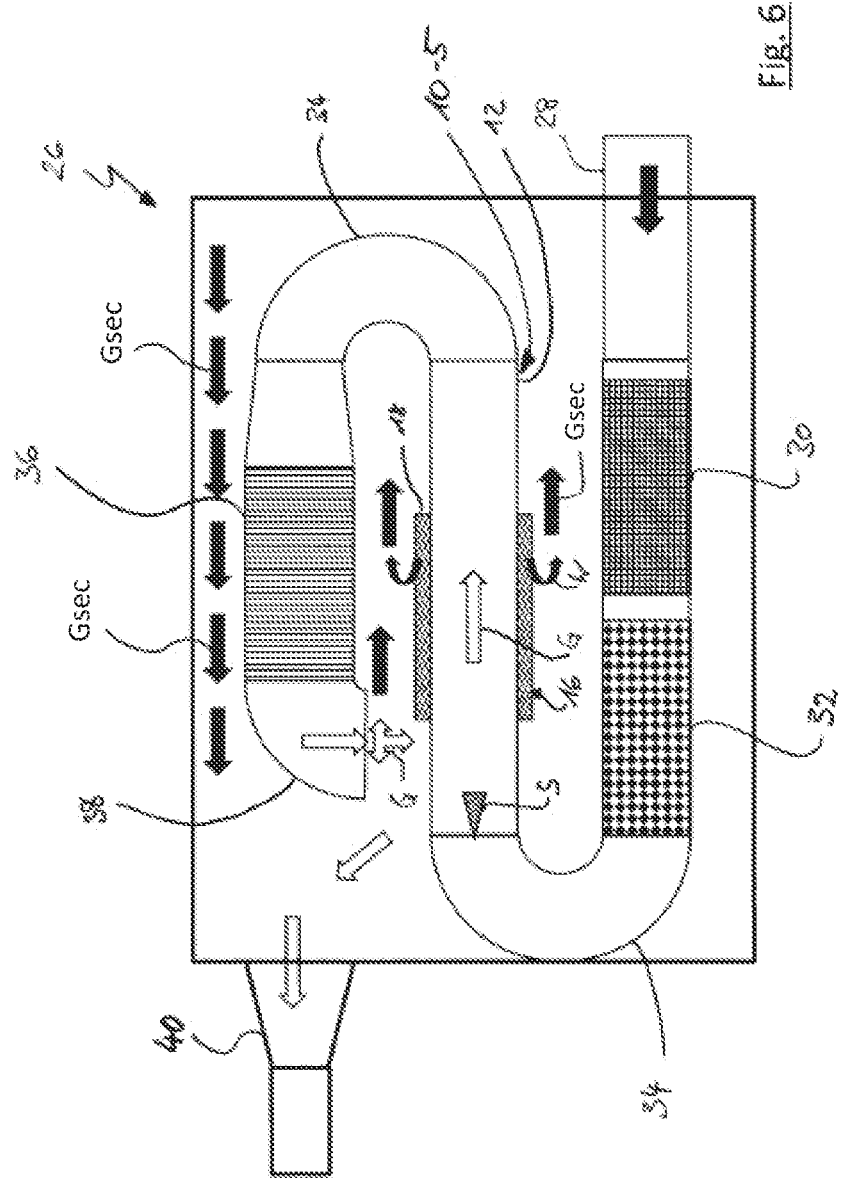

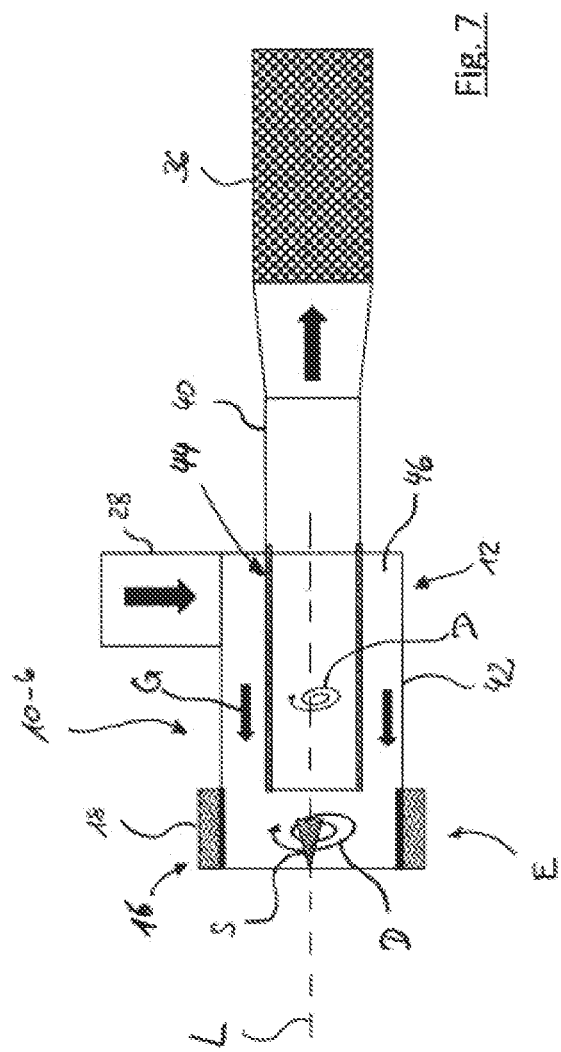

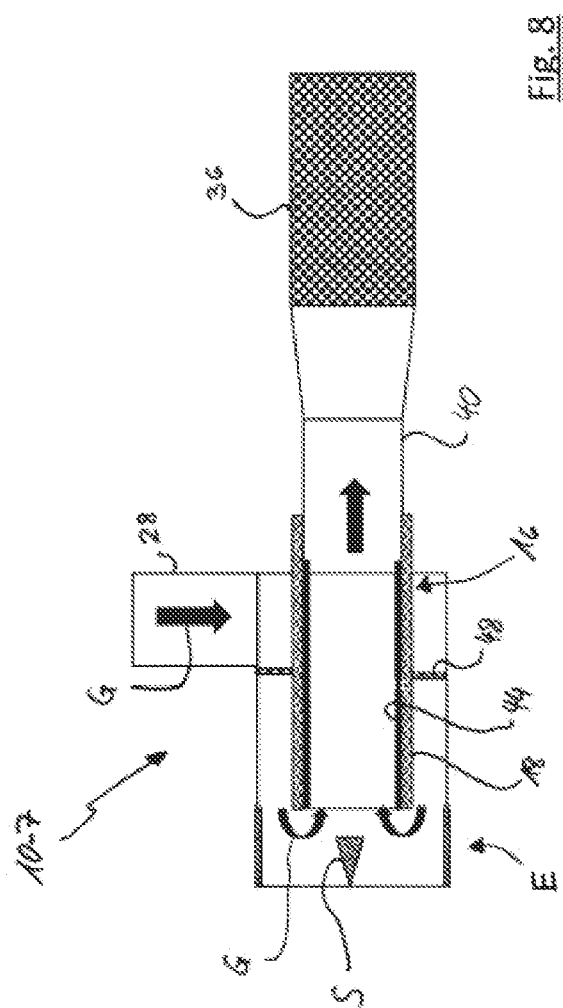

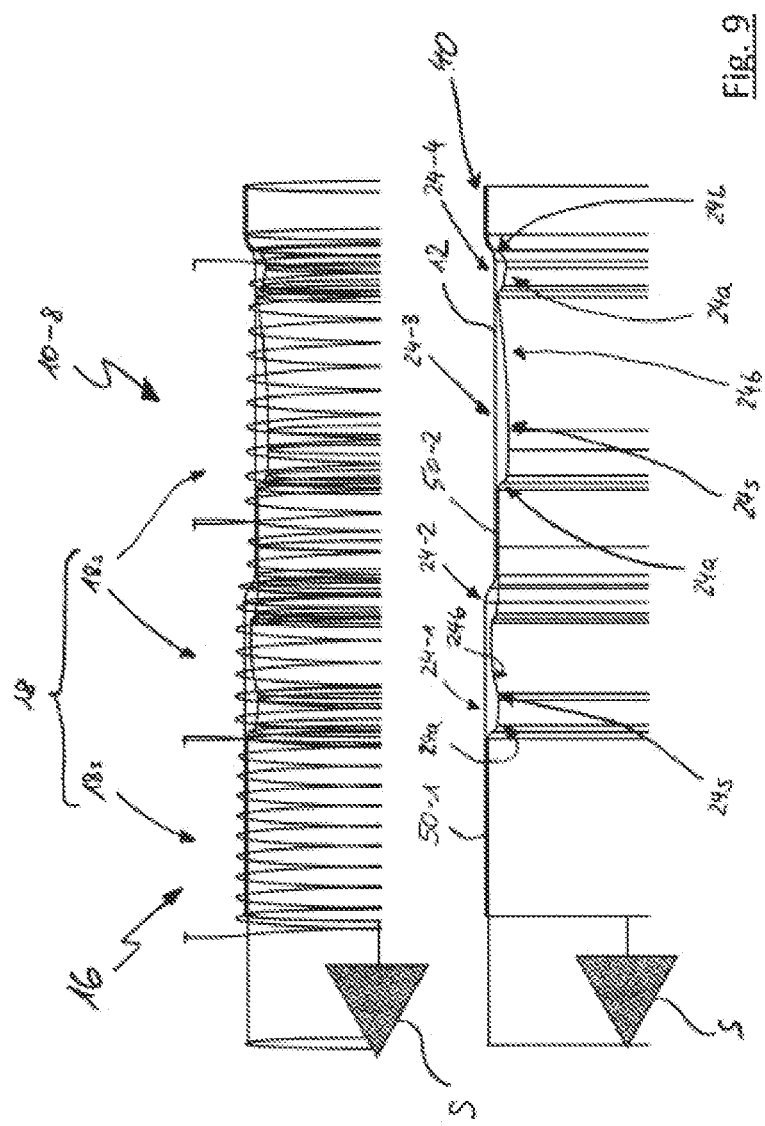

MIXING APPARATUS

CROSS-REFERENCES TO RELATED APPLICATIONS

This Patent Application claims the priority of German Patent Application 102021120423.2 filed on Aug. 5, 2021, which is incorporated herein by reference, in its entirety.

The present invention relates to a mixing apparatus for introducing and distributing a liquid additive into a gas flow, in particular for an exhaust gas system of an internal combustion engine.

The problem of reliably introducing and distributing a liquid into a gas flow in a suitable form in order, for example, to enable a chemical reaction of components of the gas flow with components of the additive arises in many application areas. In exhaust gas engineering, one is, for example, confronted with this problem in connection with the SCR process ("selective catalytic reduction") in which an aqueous urea solution is introduced into the exhaust train of a motor vehicle, for example, by means of a metering pump and an injector. Ammonia and $CO_2$ arise from the urea solution through thermolysis and hydrolysis. The ammonia produced in this manner can react in a suitable catalyst with the nitrogen oxides that are contained in the exhaust gas and that are thus efficiently removed from the exhaust gas. The above-mentioned process is increasingly gaining in importance, in particular against the background of constantly tightening pollutant limits.

It is of particular relevance to the SCR process that the urea solution is supplied in a suitable ratio to the nitrogen oxide quantity contained in the exhaust gas. It is moreover of great importance that the urea solution introduced into the exhaust gas flow is evaporated as completely as possible and is uniformly distributed in the exhaust gas flow. It is also important that the components involved in the exhaust gas purification reach a suitable operating temperature as quickly as possible since only then does an efficient exhaust gas purification start.

In known SCR mixing sections, in which the heat input substantially takes place through the exhaust gas itself, films of the introduced additive can form at the walls of the mixing section and ultimately lead to the formation of disturbing deposits. Said deposits frequently arise in the region of deflections in front of the actual SCR catalyst.

In exhaust gas aftertreatment, there is an increasing focus on the use of active heating catalysts that are heated by means of a resistance heating. The catalysts mentioned are therefore not solely passively heated by the hot exhaust gas, but are also actively heated. Due to the additional enthalpy input, an enhanced conversion of the pollutants and/or of the metered-in additives is achieved. However, a disadvantage associated with such catalysts is higher counter-pressures and other disadvantageous flow influences. On a disadvantageous mass distribution of the sprayed-in additive (e.g. a reduction agent) onto a catalyst, deposits can increasingly occur due to the high number of edges and additionally increase the counter-pressure, among other things. These deposits thus reduce the efficiency of the catalyst.

Ultimately, the concepts described above are subject to a thermodynamic conflict of aims. On the one hand, a high heat input is desired for the rapid evaporation of the reduction agent (e.g. an aqueous urea solution) and its mixing with the exhaust gas; on the other hand, too large a heat input under unfavorable conditions can also locally lead to the formation of deposits. As soon as the heat input is very high, a locally enhanced water vaporization and evaporation can take place in the film, which, in addition to an undesirable local increase in the isocyanic acid concentration, also leads to the formation of deposit products. Such deposits in the mixing section are particularly disadvantageous since they further deteriorate the mixing of the additive and can even lead to secondary emissions. Furthermore, the counter-pressure associated with the mixing apparatus increases, which ultimately leads to an increase in the fuel consumption. A further negative aspect is component damage due to corrosion.

The effects described above are problematic to a particular degree in the case of transient cycles from a cold start. The surface temperatures of the components of the mixing apparatus are then usually too low to achieve a satisfactory conversion of the additive. In the case of an SCR system, this means that the urea solution introduced is not sufficiently well evaporated due to the present, comparatively low temperatures and consequently too little ammonia is also available to ensure a complete conversion of the $NO_x$ contained in the exhaust gas. Furthermore, the selective catalytic reduction of $NO_x$ in the SCR catalyst takes place in a suboptimal range due to the temperatures that are too low.

Comparable problems can also be found in other areas of exhaust technology or even in completely different areas of application.

It is therefore an object of the present invention to find a more efficient way of introducing a liquid adhesive into a gas flow and distributing it therein. For this purpose, a suitable mixing apparatus is to be provided that is of a simple design construction and functions efficiently.

This object is satisfied by a mixing apparatus having the features of claim 1.

In accordance with the invention, the mixing apparatus has a gas-guiding section for guiding the gas flow. Furthermore, a metering-in device for introducing the additive into a metering-in region of the gas-guiding section is provided. A heating device serves for the active heating of at least one heating section of the gas-guiding section. The heating section is arranged in the metering-in region or downstream of the metering-in region. Furthermore, the gas-guiding section has, in the heating section, at least one elevated portion projecting radially into the gas flow for influencing the flow of the gas flow.

In accordance with the invention, it was recognized that by combining an active heating of a part of the gas-guiding section in the metering-in region and/or downstream thereof with a deliberate influencing of the gas flow by the radially inwardly projecting elevated portion in the heated section, an improved evaporation and mixing of the introduced additive is achieved. Furthermore, the required deposit limit metering rates can be maintained. The deposit limit metering rate is that metering-in rate (i.e. the amount of additive introduced per unit of time) above which the formation of deposits starts at a certain operating point. The invention indeed substantially aims at the use of urea-water solutions as reduction agents within the framework of an SCR system. However, the concept in accordance with the invention is also applicable in many other areas, for example, on the introduction of fuel into an exhaust gas system as part of an HCI system.

Ultimately, the contact time of the introduced fluid at corresponding regions of the wall of the gas-guiding section is increased and a heat flow in just this region is simultaneously introduced by the at least one elevated portion. This results in an increase in the degree of evaporation of the additive. The two aspects work together synergistically such that a substantially improved incorporation of the additive is achieved and the formation of deposits is considerably reduced.

Further embodiments of the invention are set forth in the claims, in the description, and in the enclosed drawings.

In accordance with an embodiment, the elevated portion extends in a peripheral direction of the gas-guiding section. The elevated portion can extend over a part of the periphery or can be closed in the peripheral direction. At least two elevated portions are particular provided that are arranged behind one another in the direction of flow of the gas flow in order to further increase the aforementioned contact time.

The elevated portion can also extend in an axial direction of the gas-guiding section. At least two elevated portions are in particular provided that are arranged distributed in the peripheral direction of the heating section. These elevated portions preferably extend substantially in parallel with one another.

In many cases, an extent of the elevated portion(s) in a direction perpendicular to or in parallel with the direction of flow of the gas and/or the longitudinal axis of the gas-guiding section is advantageous. However, applications are also conceivable in which the at least one elevated portion extends obliquely.

It is generally also possible to combine axially extending elevated portions and elevated portions extending in the peripheral direction to achieve the desired effect.

In particular in the case of elevated portions extending in the peripheral direction, an upstream flank of the elevated portion and/or a downstream flank of the elevated portion is/are formed at least sectionally planar in the direction of flow of the gas. To produce the desired flow pattern in the region close to the wall and/or to suitably influence the additive film that may form at the wall of the housing guide section, said flanks can also be sectionally curved. The flanks can each have sections having different gradients or different curvatures. A combination of planar and curved sections is likewise possible. In the case of elevated portions extending in the axial direction, the terms "upstream" and "downstream" refer to possibly present swirl components of the exhaust gas flow, i.e. flow components that flow in the peripheral direction of the gas-guiding section.

The upstream flank of the elevated portion and/or the downstream flank of the elevated portion can merge into one another via a curved section to prevent flow breakdowns.

The at least one elevated portion can be produced by a reshaping process of the gas-guiding section. In many cases, the gas-guiding section is formed by a sheet metal part, wherein the shape of the cross-section of the gas-guiding section is generally—i.e. independently of its design— selected as required (for example, circular, oval, or polygonal). A bead can be inserted in a simple manner into such a sheet metal part and then forms an elevated portion projecting into the gas flow.

Alternatively, it is possible to form the elevated portion by a local thickening of the wall of the gas-guiding section. Due to a deliberate variation of the wall thickness, the thermal properties of the mixing apparatus can also be locally adapted since wall regions of different thickness have different heat input or heat output and/or heat storage properties.

It is also possible to combine regions having varying wall thicknesses and reshaped regions in order to provide the heating section with suitable elevated portions that, in cooperation with a correspondingly dimensioned and designed heating device, enable the required deposit-reduced introduction of the additive.

The gas-guiding section can, in the heating section, have at least a first and a second elevated portion-free section between which the elevated portion is arranged, in particular wherein the second elevated portion-free section has a smaller cross-sectional surface than the first elevated portion-free section. For example, the cross-section of the gas-guiding section in front of the elevated portion is larger than behind the elevated portion.

For an improved mixing of the additive, at least one static mixer can be arranged upstream and/or downstream of the metering-in device. For example, this mixer is arranged and designed such that it imparts a swirl component to at least one portion of the gas flow.

In accordance with an embodiment of the mixing apparatus, the gas-guiding section has a mixing chamber having a first end region that has a gas inlet of the gas-guiding section. Furthermore, a second end region is provided that is disposed opposite the first end region and that comprises the metering-in region. The gas-guiding section further comprises a dip tube that forms a gas outlet of the gas-guiding section and that projects from the first end region into the mixing chamber. A longitudinal axis of the mixing chamber and a longitudinal axis of the dip tube are in particular arranged in parallel, preferably coaxially. A gas flow flowing into the mixing apparatus thus enters into the first end region of the gas-guiding section, namely into the mixing chamber, and flows to the oppositely disposed end region in which the metering-in region is arranged. The gas flow acted on by the additive then exits from the gas-guiding section through the dip tube that projects from the first end section into the mixing chamber. Such a design enables a particularly efficient introduction of the additive with a simultaneously compact design of the mixing apparatus.

To prevent deposits and to increase the evaporation power, the heating device can be arranged at the dip tube. It is also possible to arrange the heating device at the second end region, i.e. in the region that also has the metering-in region with the metering-in device.

It is generally also possible to provide a heating device both at the dip tube and in the second end region. In this case, two heating sections are then provided, namely one in the metering-in region and one downstream of the metering-in region (at the dip tube). At least one elevated portion is arranged in the region of the two heating sections, preferably in both heating sections.

The gas inlet can be designed and arranged such that the gas flow can be introduced into the mixing chamber in a direction transverse to, in particular perpendicular to and laterally offset from, a longitudinal axis of the mixing chamber. Due to the introduction of the gas flow into the mixing chamber transversely to and laterally offset from the longitudinal axis of said mixing chamber, the gas flow is acted on by a swirl component that depends, among other things, on the geometry of the dip tube and an inner wall of the mixing chamber as well as on the arrangement and the design of the inlet opening. Due to a variation of said geometries, the gas flow in the interior of the mixing chamber and thus the characteristics of the mixing apparatus can be adapted to the respective present requirements.

A radial gap is in particular provided between the mixing chamber and the dip tube, through which radial gap exhaust gas flows from the first end region to the second end region. A flow-conducting device can be arranged in the radial gap. The flow-conducting device can either serve to produce a swirl in the gas flow, for example, if said swirl is not produced by the design and arrangement of the gas inlet.

However, it is also possible that the flow-conducting device serves to "rectify" the gas flow if this is advantageous in the respective application.

The present invention further relates to an exhaust gas purification device for purifying an exhaust gas comprising a mixing apparatus in accordance with any one of the embodiments described above.

In accordance with an embodiment of the exhaust gas purification device, the mixing apparatus is arranged upstream of at least one SCR catalyst unit. At least one particulate filter unit and/or one oxidation catalyst unit can additionally be arranged upstream of the mixing apparatus.

The mixing apparatus can be arranged in a chamber that is in flow connection with the SCR catalyst unit, in particular with an outlet-side end of the SCR catalyst unit, so that the mixing apparatus can at least sectionally be acted on by at least a portion of the exhaust gas flow exiting from the SCR catalyst unit. The SCR catalyst unit is preferably arranged in the chamber. In this design, the heat of the exhaust gas is additionally used to at least sectionally heat up the mixing apparatus and/or the SCR catalyst unit from the outside as well and thus to bring it more quickly to a suitable operating temperature.

The present invention will be explained in the following purely by way of example with reference to advantageous embodiments and to the enclosed drawings. There are shown:

FIG. 1 a conventional mixing apparatus with an active heating device;

FIG. 2 a first embodiment of the mixing apparatus in accordance with the invention;

FIG. 3 a second embodiment of the mixing apparatus in accordance with the invention;

FIG. 4 a third embodiment of the mixing apparatus in accordance with the invention;

FIG. 5 a fourth embodiment of the mixing apparatus in accordance with the invention;

FIG. 6 a fifth embodiment of the mixing apparatus in accordance with the invention;

FIG. 7 a sixth embodiment of the mixing apparatus in accordance with the invention;

FIG. 8 a seventh embodiment of the mixing apparatus in accordance with the invention; and FIG. 9 an eighth embodiment of the mixing apparatus in accordance with the invention.

FIG. 1 shows a conventional mixing apparatus 10 comprising a gas-guiding section 12 that is substantially designed as a smooth tube. At the left side of the gas-guiding section 12, the latter is connected to an exhaust gas system of an internal combustion engine. Exhaust gas G enters into the gas-guiding section 12 at this side, which is indicated by two black arrows. An injector 14 is also arranged here through which an aqueous urea solution is introduced into the exhaust gas flow G. A corresponding spray cone S is schematically drawn in. Upstream of the injector 14 and/or in the gas-guiding section 12 itself, a swirl generator, not shown, is arranged by which the gas flow G was acted on by a swirl component to be able to better distribute the urea in the gas flow G. The swirl component is schematically represented by a vortex D.

A section 16 of the gas-guiding section is provided with a heating device 18. The heating device 18 permits the active heating of the section 16 (also designated as a heating section) to assist in the evaporation of the introduced urea.

The urea is usually introduced in a pulse-width modulated manner into the gas flow G. This means that the metering in takes place intermittently. The exhaust gas and the mixing apparatus are cold in particular after a cold start. This has the result that the introduced urea is not completely evaporated, but forms a film at the inner wall of the gas-guiding section 12. The heating device 18 indeed accelerates the reaching of the operating point, but the formation of a film cannot be effectively avoided in many cases.

In FIG. 1, it is shown that the film produced during the metering-in process has migrated during the closing time of the injector 14. It is transported by the exhaust gas flow G to the outlet-side end of the gas-guiding section 12. This has the result that an imperfect mixing through is produced at the downstream end of the mixing apparatus 10. In regions close to the wall, the concentration of the urea is greater than in the central region, which is schematically indicated by a urea profile 20.

Which processes occur when a urea droplet 22 impacts the inner wall of the gas-guiding section 12 are likewise schematically shown in FIG. 1. On the one hand, a so-called "rebound" effect occurs. The urea droplet 22 strikes the inner wall of the section 12 at an angle and bounces off it, wherein it is also carried along in the direction of flow due to the gas flow G. Under certain circumstances, the droplet 22 bursts into secondary droplets that are likewise taken along by the gas flow G. However, in some cases the so-called "stick" effect also occurs on the collision of the droplet 22 with the inner wall of the section 12. The droplet 22 remains on the wall after the impact and forms a film F together with other droplets 22, said film F migrating due to the effect of the gas flow G (from the left to the right in FIG. 1).

At sufficiently high temperatures of the inner wall of the gas-guiding section 12 (greater than at approximately 210° C.), a permanent film F is usually not formed. A pulsating film formation is rather to be expected, i.e. the inner wall of the section 12 is wetted after an injector pulse, wherein the film F is formed that in turn migrates in the direction of flow. This is repeated with the next injector pulse.

As already described above, the comparatively rapid migration of the film F leads to an uneven distribution of the urea in the gas flow G. Moreover, the formation of deposits can occur under unfavorable temperature conditions.

In accordance with the invention, it was recognized that it is advantageous to keep the film F longer in the heating section 16. For this purpose—as shown on the basis of the mixing apparatus 10-1 in FIG. 2—a plurality of elevated portions 24 are provided that project in the radial direction into the gas flow. The inner wall of the gas-guiding section 12 thus, at least in the heating section 16, at least sectionally does not have a smooth surface, as is the case with conventional mixing apparatus (see FIG. 1). The mixing apparatus 10-1 presents—figuratively speaking—a resistance to the film F through the elevated portions 24, which resistance the film F has to overcome during its migration. The elevated portions 24 can, for example, be beads that are introduced into the gas-guiding section 12. Their arrangement and number can be selected in accordance with the respective present requirements profile. For example, they extend completely in the peripheral direction of the section 12. However, it is also possible to design them only sectionally in the peripheral direction and, for example, to provide elevated portions arranged offset in the axial direction. An asymmetrical arrangement or formation of the elevated portions 24 can in particular be advantageous in asymmetrical designs of the gas-guiding section 12.

FIG. 2 clearly shows the resistance which counteracts the migration of the film F (see "stick" effect). Said resistance has to "hike up" the upstream flanks 24*a* of the elevated portions. With the so-called "rebound" effect, advantages also result due to the elevated portions 24. If droplets 22 namely impact the upstream flanks 24a of the elevated portions 24 that are inclined into the interior of the section 12, they are deflected less in the direction of flow—compared to a smooth surface. Due to this geometric effect, a better distribution of the added urea in the central region of the gas-guiding section is brought about, whereby the positive effect of an improved evaporation is assisted due to a slower migration of the film F.

FIG. 3 shows a mixing apparatus 10-2 that substantially corresponds to the mixing apparatus 10-1. Therebelow, alternative mixing apparatus 10-3 and 10-4 are shown in FIGS. 4 and 5. This representation facilitates the comparison of the different embodiments.

In the embodiment 10-3 in accordance with FIG. 4, a narrower spray cone S is provided. Furthermore, a single elevated portion 24 is provided that is substantially symmetrically designed and substantially forms the total inner wall of the gas-guiding section 12. The heating device 18 is arranged in the vertex of the elevated portion 24 and in adjacent regions. The heating section 16 thus comprises a substantially central region of the gas-guiding section 12.

The elevated portion 24 forms a nozzle-like constriction. The upstream section of the constriction is wetted by urea on operation of the injector that is not shown in FIGS. 2 to 9 for reasons of simplicity. The film F produced then migrates into the constriction and enters into the heating section 16, where it is vaporized very efficiently. Due to the constriction produced by the elevated portion 24, the gas flow G is accelerated, which can likewise contribute to an improved mixing through, in particular since a swirl component D is present in the gas flow G.

This is also the case in the mixing apparatus 10-4. Here, the elevated portion 24 is arranged in a downstream end region of the heating section 16. In the present example, said elevated portion 24 is rotationally symmetrical. An upstream section of the upstream flank 24a of the elevated portion 24 is comparatively shallowly inclined. It merges into a steeper section. In its vertex, the upstream flank 24a of the elevated portion 24 merges over a curved section 24s (vertex section) into a substantially planar slope that is somewhat flatter in design than the steeper one of the two sections of the upstream flank 24a of the elevated portion 24. The planar slope forms a downstream flank 24b of the elevated portion 24. The curved vertex section 24s between the upstream flank 24a and the downstream flank 24b prevents a breaking away of the flow, which has a positive effect on the counterpressure generated by the mixing apparatus 10-4.

It is understood that the geometry of the elevated portions can be selected as required. It is by all means possible to combine individual aspects of the geometries described above with one another. The position and/or number of the elevated portions can also be adapted as required.

FIG. 6 shows a chamber 26 of an exhaust gas system that can, for example, also function as an acoustic chamber. The chamber 26 comprises a gas inlet section 28 that is connected in a technical flow aspect to an oxidation catalyst unit 30 (e.g. a DOC catalyst). Exhaust gas flowing out of the catalyst unit 30 is then fed to a particulate filter 32. Subsequently, the exhaust gas flows through a deflection section 34 to the gas-guiding section 12 of a mixing apparatus 10-5. Said gas-guiding section 12 comprises an injector, not shown, for generating a spray cone S and a heating section 16. In this region, at least one elevated portion is further provided that projects into the gas flow G. However, said at least one elevated portion is not shown in FIG. 6 for reasons of clarity. For example, the mixing apparatus 10-5 can be designed in accordance with any of the embodiments described above.

After the exiting from the mixing apparatus 10-5, the exhaust gas flows via a further deflection section 34 to an SCR catalyst unit 36. Exhaust gas exiting therefrom then enters the interior of the chamber 26. A corresponding gas outlet 38 is arranged and configured such that the mixing apparatus 10-5 is at least sectionally directly flowed onto by exhaust gas. The heating of said mixing apparatus 10-5 is thereby assisted, which is in particular advantageous on a cold start of the internal combustion engine.

The exhaust gas G exiting from the outlet 38 does not flow completely in a direct manner to a gas outlet section 40 of the chamber 26 that is connected to further components of the exhaust gas system. A portion of this exhaust gas is distributed in the chamber 26 and forms a secondary flow Gsec that also applies heat to the catalysts 30, 32, 36 from the outside so that they reach their operating point more quickly.

A further advantage of the arrangement described with reference to FIG. 6 is that heat W of the heating device 18 of the mixing apparatus 10-5 output radially outwardly does not "fizzle out" unused in the external space. This heat contributes to the heating of the gas flow G in the chamber 26, whereby a fast reaching of the operating temperature of all the components is achieved.

The chamber 26 can also serve as an acoustic chamber and can comprise components for intentionally influencing the sound emissions, in particular for their damping.

FIG. 7 shows a mixing apparatus 10-6 to which exhaust gas is supplied through the gas inlet section 28. The exhaust gas inlet section 28 is arranged approximately perpendicular to a longitudinal axis L of the mixing apparatus 10-6. The inlet section 28 is furthermore arranged such that the exhaust gas flows in laterally offset from the longitudinal axis of the apparatus 10-5.

The gas-guiding section 12 of the apparatus 10-6 comprises a mixing chamber 42 into which a dip tube 44 projects. A radial gap 46, into which the exhaust gas is introduced, is provided between the inner wall of the mixing chamber 42 and the dip tube 44. Due to the lateral offset of the introduction, the gas flow G in the gap 46 not only has an axial component, but also a swirl component. In other words, the exhaust gas flows around the dip tube 44 at the outer side in spiral form before it enters into a metering-in region E that is arranged at an end region of the mixing chamber disposed opposite the gas inlet section 28. The gas flow G acted on by swirl is here acted on by a spray cone S by means of an injector, not shown. Since the heating device is arranged in the metering-in region E, the heating section 16 and the metering-in region E substantially coincide.

To improve the evaporation of the added urea, elevated portions arranged distributed in the peripheral direction and having an axial extent are provided in the heating section 16 (not shown). The exhaust gas acted on by swirl therefore has to flow over these elevated portions. In this respect, substantially the same effects occur such as were described at the beginning with reference to FIG. 2.

Since exhaust gas is permanently supplied from the inlet section 28, the exhaust gas that is acted on by urea and that furthermore has a swirl component D is urged into the dip tube 44 before it leaves the mixing apparatus 10-6 via the gas outlet section 40. The exhaust gas is then fed to the SCR catalyst unit 36.

A further mixing apparatus 10-7 is explained with reference to FIG. 8. Here, too, the gas inlet section 28 can be designed as a so-called screw inlet, whereby the gas flow G is initially acted on by swirl. Due to a perforated metal sheet 48 or a functionally similar flow-conducting element, the gas flow G is now rectified so that it substantially has only one axial flow component. In the metering-in region E, which is not actively heated in the present embodiment, the application of the urea solution to the gas flow G takes place. In this respect, a flow deflection takes place, due to which the exhaust gas flows in the opposite direction through the dip tube 44 from the apparatus 10-7 and to the SCR catalyst unit 36. The dip tube 44 is provided with a heating device 18. The heating section 16 of the apparatus 10-7 is thus formed at the dip tube 44. At least one elevated portion, which preferably extends in the peripheral direction of the dip tube 44, is also provided in the region of the heating section 16.

It is generally also possible to arrange a further heating device in the metering-in region E of the mixing apparatus 10-7 to ensure an even better evaporation of the urea solution. The axial elevated portions described with reference to FIG. 7 can then also be provided in this region, if necessary.

This should also make it clear that an active heating can be provided at the most varied positions of the respective mixing apparatus. In accordance with the invention, it is only essential that at least one elevated portion projecting into the gas flow is also provided in at least one heating section in order to achieve the initially described synergistic effect. Ultimately, however, it depends on the respective application how the elevated portion is specifically designed and arranged or whether a plurality of elevated portions of the same or a different type are provided.

FIG. 9 shows a further mixing apparatus 10-8 in a sectional view. In the upper half of the Figure, the heating device 18 is indicated that comprises three heating coils 18s. Together, they define the actively heated heating section 16.

The representation of the heating device 18 was omitted in the lower part of FIG. 9 to be able to better recognize the design of the gas-guiding section 12 in the region of the heating section 16. Downstream of the spray cone S, the gas-guiding section 12 initially has a first elevated portion-free section 50-1. This is adjoined by a first elevated portion having an upstream flank 24a that has a first, comparatively steep section and a second, more shallowly inclined section. The downstream flank 24b of the elevated portion 24-1 is likewise comparatively weakly inclined. A second elevated portion 24-2 follows that ultimately results in a true cross-sectional constriction. A second elevated portion-free section 50-2 subsequent to the second elevated portion 24-2 namely has a smaller diameter than the elevated portion-free section 50-1. Downstream of the elevated portion-free section 50-2 a further elevated portion 24-3 is arranged that, in turn, has a comparatively steep upstream flank 24a and a comparatively flat downstream flank 24b. The transition 24s between the two flanks 24a, 24b is elongated and curved in order, on the one hand, to inhibit the migration of the urea film and, on the other hand, to achieve a good evaporation of the urea with a simultaneously optimized flow dynamics.

The elevated portion 24-3 is directly adjoined by a further elevated portion 24-4 that has a comparatively steep section and a section that is somewhat longer but flatter in the axial direction at its upstream flank 24a. The downstream flank 24b is comparatively steep and merges into a widened outlet section 40 into which, for example, a tubular connection section of the exhaust gas system can be inserted.

In contrast to embodiments in which the elevated portions are produced by a sectional reshaping of a sheet metal part, the elevated portions are formed by a variation of the thickness of the material of the wall of gas-guiding section 12 in the case of the apparatus 10-8. Thicker sections are thermally more inert and store more thermal energy so that a particularly good evaporation of the introduced additive takes place here. It is understood that beads and elevated portions produced by reshaping can be combined from a solid material.

REFERENCE NUMERAL LIST

10, 10-1-10-8 mixing apparatus
12 gas-guiding section
14 injector
16 heating section
18 heating device
18s heating coil
20 urea profile
22 droplet
24, 24-1-24-4 elevated portion
24a upstream flank
24s vertex section
24b downstream flank
26 chamber
28 gas inlet section
30 oxidation catalyst unit
32 particulate filter
34 deflection section
36 SCR catalyst unit
38 gas outlet
40 gas outlet section
42 mixing chamber
44 dip tube
46 radial gap
48 perforated metal sheet
50-1, 50-2 elevated portion-free section
G exhaust gas flow
L longitudinal axis
Gsec secondary flow
S spray cone
D swirl component/vortex
F film
E metering-in region
W heat flow

The invention claimed is:

1. A mixing apparatus for introducing and distributing a liquid additive into a gas flow, said mixing apparatus comprising
   a gas-guiding section for guiding the gas flow;
   a metering-in device for introducing the liquid additive into a metering-in region of the gas-guiding section; and
   a heating device for actively heating at least one heating section of the gas-guiding section,
   wherein the heating section is arranged in the metering-in region and/or downstream of the metering-in region and the gas-guiding section has, in the heating section, at least one elevated portion projecting radially into the gas flow for influencing the flow of the gas flow,
   wherein the elevated portion extends in a peripheral direction of the gas-guiding section,
   wherein at least two elevated portions are provided that are arranged behind one another, viewed in a direction of flow of the gas flow,
   wherein the elevated portion is produced by a reshaping process of the gas-guiding section, and/or wherein the elevated portion is formed by a local thickening of a wall of the gas-guiding section.

2. The mixing apparatus in accordance with claim 1, wherein the elevated portion extends in an axial direction of the gas-guiding section.

3. The mixing apparatus in accordance with claim 2, wherein at least two elevated portions are provided that are arranged distributed in the peripheral direction of the heating section.

4. The mixing apparatus in accordance with claim 1, wherein an upstream flank of the elevated portion and/or a downstream flank of the elevated portion is/are formed at least sectionally planar in the direction of flow of the gas.

5. The mixing apparatus in accordance with claim 1, wherein an upstream flank of the elevated portion and/or a downstream flank of the elevated portion is/are at least sectionally curved in the direction of flow of the gas.

6. The mixing apparatus in accordance with claim 1, wherein an upstream flank of the elevated portion is at least sectionally steeper than a downstream flank of the elevated portion.

7. The mixing apparatus in accordance with claim 1, wherein an upstream flank of the elevated portion and/or a downstream flank of the elevated portion merges/merge into one another via a curved section.

8. The mixing apparatus in accordance with claim 1, wherein the elevated portion is produced by a reshaping process of the gas-guiding section.

9. The mixing apparatus in accordance with claim 8, wherein the elevated portion is a bead.

10. The mixing apparatus in accordance with claim 1, wherein the elevated portion is formed by a local thickening of a wall of the gas-guiding section.

11. The mixing apparatus in accordance with claim 1, wherein the gas-guiding section has, in the heating section, at least a first and a second elevated portion-free section between which the elevated portion is arranged.

12. The mixing apparatus in accordance with claim 11, wherein the second elevated portion-free section has a smaller cross-sectional surface than the first elevated portion-free section.

13. The mixing apparatus in accordance with claim 1, wherein at least one static mixer is arranged upstream and/or downstream of the metering-in device to apply a swirl component to the gas flow.

14. The mixing apparatus in accordance with claim 1, wherein the gas-guiding section has a mixing chamber having a first end region, which has a gas inlet of the gas-guiding section, and having a second end region that is disposed opposite the first end region and that comprises the metering-in region, and wherein the gas-guiding section further comprises a dip tube that forms a gas outlet of the gas-guiding section and that projects from the first end region into the mixing chamber.

15. The mixing apparatus in accordance with claim 14, wherein a longitudinal axis of the mixing chamber and a longitudinal axis of the dip tube are arranged in parallel.

16. The mixing apparatus in accordance with claim 14, wherein the heating device is arranged at the dip tube.

17. The mixing apparatus in accordance with claim 14, wherein the heating device is arranged in the second end region.

18. The mixing apparatus in accordance with claim 14, wherein the gas inlet is designed and arranged such that the gas flow can be introduced into the mixing chamber in a direction transverse to a longitudinal axis of the mixing chamber.

19. The mixing apparatus in accordance with claim 18, wherein the gas inlet is designed and arranged such that the gas flow can be introduced into the mixing chamber in a direction perpendicular to and laterally offset from the longitudinal axis of the mixing chamber.

20. The mixing apparatus in accordance with claim 14, wherein a radial gap is provided between the mixing chamber and the dip tube, through which radial gap gas flows from the first end region to the second end region.

21. An exhaust gas purification device for purifying an exhaust gas of an internal combustion engine comprising a mixing apparatus, said mixing apparatus comprising
a gas-guiding section for guiding the gas flow;
a metering-in device for introducing the liquid additive into a metering-in region of the gas-guiding section; and
a heating device for actively heating at least one heating section of the gas-guiding section,
wherein the heating section is arranged in the metering-in region and/or downstream of the metering-in region and the gas-guiding section has, in the heating section, at least one elevated portion projecting radially into the gas flow for influencing the flow of the gas flow;
wherein the elevated portion extends in a peripheral direction of the gas-guiding section,
wherein at least two elevated portions are provided that are arranged behind one another, viewed in a direction of flow of the gas flow,
wherein the elevated portion is produced by a reshaping process of the gas-guiding section, and/or wherein the elevated portion is formed by a local thickening of a wall of the gas-guiding section.

22. The exhaust gas purification device in accordance with claim 21, wherein the mixing apparatus is arranged downstream of at least one SCR catalyst unit.

23. The exhaust gas purification device in accordance with claim 22, wherein at least one particulate filter unit and/or one oxidation catalyst unit is/are additionally arranged upstream of the mixing apparatus.

24. The exhaust gas purification device in accordance with claim 22, wherein the mixing apparatus is arranged in a chamber that is in connection with the SCR catalyst unit so that the mixing apparatus can at least sectionally be acted on by at least a portion of the exhaust gas flow exiting from the SCR catalyst unit.

25. The exhaust gas purification device in accordance with claim 24, wherein the SCR catalyst unit is arranged in the chamber.

* * * * *